US010520328B2

(12) United States Patent
Gürel et al.

(10) Patent No.: US 10,520,328 B2
(45) Date of Patent: Dec. 31, 2019

(54) SYSTEM FOR CUSTOMIZED GAMES AND ROUTES (TOURS) FOR CULTURAL AND NATURAL HERITAGE

(71) Applicants: Eda. Gürel, Ankara (TR); Arzu Sibel İkinci, Ankara (TR); Mine Sofuoğlu, Ankara (TR); Serdar Vural Öktem, Ankara (TR)

(72) Inventors: Eda. Gürel, Ankara (TR); Arzu Sibel İkinci, Ankara (TR); Mine Sofuoğlu, Ankara (TR); Serdar Vural Öktem, Ankara (TR)

( * ) Notice: Subject to any disclaimer, the term of this patent is extended or adjusted under 35 U.S.C. 154(b) by 14 days.

(21) Appl. No.: 16/076,024

(22) PCT Filed: Feb. 1, 2017

(86) PCT No.: PCT/TR2017/000019
§ 371 (c)(1),
(2) Date: Aug. 7, 2018

(87) PCT Pub. No.: WO2017/184094
PCT Pub. Date: Oct. 26, 2017

(65) Prior Publication Data
US 2019/0301888 A1  Oct. 3, 2019

(30) Foreign Application Priority Data

Apr. 22, 2016  (TR) ................ 2016/05283

(51) Int. Cl.
*G01C 21/36* (2006.01)
*H04W 4/02* (2018.01)
(Continued)

(52) U.S. Cl.
CPC ....... *G01C 21/3664* (2013.01); *G01C 21/206* (2013.01); *G01C 21/3484* (2013.01);
(Continued)

(58) Field of Classification Search
CPC .............. G01C 21/206; G01C 21/3484; G01C 21/3611; G01C 21/3623; G01C 21/3664;
(Continued)

(56) References Cited

U.S. PATENT DOCUMENTS 6,515,586 B1 * 2/2003 Wymore ................ G08B 13/10
   307/116
8,506,404 B2 * 8/2013 Distanik ............. G07F 17/3279
   463/36
(Continued)

*Primary Examiner* — Tyler J Lee

(57) ABSTRACT

The present invention provides a method and a system of providing information and navigation to a visitor at an indoor or outdoor cultural and/or natural attraction or a site. The information is provided with respect to objects and materials or the like on the site based on the visitors' needs, wants, interests, and backgrounds depending on his/her selection criteria and location in order to foster and enhance learning and real-time occupancy data and carrying capacities of each location to improve visitor experience and manage crowd on the site. Accordingly, the present invention comprises two subsystems for education and navigation for cultural and/or natural heritage attractions or sites to enrich visitor experience and make the best of their time. The system is implemented with a host computer, a server, and a mobile computing device connected by a cloud networking, used by an administrator and a visitor, the visitor playing a question and answer game or following a chosen route.

16 Claims, 2 Drawing Sheets

Illustration of the System Environment

(51) Int. Cl.

| | |
|---|---|
| *G01C 21/34* | (2006.01) |
| *H04W 4/029* | (2018.01) |
| *H04W 4/024* | (2018.01) |
| *G01C 21/20* | (2006.01) |
| *G06Q 50/20* | (2012.01) |
| *H04W 84/12* | (2009.01) |
| *H04W 4/80* | (2018.01) |

(52) U.S. Cl.
 CPC ...... *G01C 21/3611* (2013.01); *G01C 21/3623* (2013.01); *G06Q 50/20* (2013.01); *H04W 4/024* (2018.02); *H04W 4/029* (2018.02); *H04W 4/80* (2018.02); *H04W 84/12* (2013.01)

(58) Field of Classification Search
 CPC ...... G06Q 50/20; H04W 4/024; H04W 4/029; H04W 4/80; H04W 84/12
 See application file for complete search history.

(56) References Cited

U.S. PATENT DOCUMENTS

| | | | |
|---|---|---|---|
| 10,425,769 B2* | 9/2019 | Madhvanath | H04L 41/22 |
| 2006/0168300 A1* | 7/2006 | An | G09B 5/06 |
| | | | 709/231 |
| 2008/0280676 A1* | 11/2008 | Distanik | G07F 17/32 |
| | | | 463/29 |
| 2009/0175499 A1* | 7/2009 | Rosenblatt | G06K 9/228 |
| | | | 382/103 |
| 2009/0319182 A1* | 12/2009 | Monteverde | G06F 16/29 |
| | | | 701/533 |
| 2012/0052954 A1* | 3/2012 | Zhu | A63F 13/10 |
| | | | 463/42 |
| 2012/0278721 A1 | 11/2012 | Beidel | |
| 2013/0024203 A1 | 1/2013 | Flores | |
| 2015/0324636 A1* | 11/2015 | Bentley | G11B 27/17 |
| | | | 386/227 |
| 2016/0011733 A1* | 1/2016 | Mann | G06F 3/0484 |
| | | | 715/709 |
| 2018/0018081 A1* | 1/2018 | Dattilo-Green | H04L 67/025 |
| 2018/0019889 A1* | 1/2018 | Burns | H04L 12/2807 |

\* cited by examiner

SYSTEM FOR CUSTOMIZED GAMES AND ROUTES (TOURS) FOR CULTURAL AND NATURAL HERITAGE

BACKGROUND OF THE INVENTION

There are a variety of systems presently available which are aimed at providing a person touring a city, a museum, or the like with information provided with cutting-edge technology, state-of-the-art electronics and audio-visual equipment. Examples of such systems typically include a receiver which receives a signal depending on where in the museum or the like the person is located. Depending on the location of the person, an audio/video recording is played or written information is provided which is relevant to his/her location.

Available systems are designed to overcome the need for having a personal guide in the museum or on the site. However, these systems are typically designed to cater to the needs of a one type of a visitor. Organizations with in-depth or scholarly content are less accessible to the majority of people in the public and children. Most of the cases, the experience is not designed for children's attention span. In addition, the information provided by these available interactive systems is either too complex or they do not allow the experience to be structured according to the needs, wants, interests, and backgrounds of the visitors. Furthermore, these available systems do not optimize the number of visitors in each location, section, room, hall, area, or the like on the site to prevent crowding. The present invention seeks to address this.

SUMMARY OF THE INVENTION

This invention relates to a method of providing information to a user visiting an indoor or outdoor attraction or a site of cultural and/or natural heritage such as a museum, a palace, a national park, a garden or the like and the system therefor to foster and enhance visitor learning and experience. Accordingly, the embodiments of the invention provide a system implemented with a host computer, a server, and a mobile computing device connected by cloud networking. The system can be used by an administrator of the attraction or the site and visitors who are looking for information and/or direction. The system can include a database in the server. The database can store questions, answers, clues, and information on the objects and materials or the like on the site, their locations and carrying capacities for these locations. The system can also include a portal accessible on the host computer. The portal can provide a user interface to the administrator to create, list, delete or edit records concerning questions and answers worth a specific amount of points and clues, upload information about the related objects and materials or the like in various formats including written, audio and video files, indicate their locations and carrying capacities for each location of the site. The server can receive real-time information from sensors installed around the site about the number of people in each location, section, room, hall, area or the like on the site. The sensors can be at least one of a motion detectors that can signal movement of visitors, therefore, a time and attendance record can be developed, including the time of the day when people enter and exit from each location, section, room, hall, area or the like of the site. The system can further include a mobile device application accessible with the mobile computing device. The mobile device application can provide questions and answers for a game or a route to the mobile computing device of the visitor depending on the visitors' choice based on their needs, wants, interests, and backgrounds. The mobile device application can recognize proximity of the visitor to the wireless sensors in and around the site in order to navigate the person and receive information regarding the appropriate direction that will optimize the number of visitors in a specific location, section, room, hall, area or the like on the site to prevent crowding based on the specified carrying capacities by the administrator and the real-time occupancy counts of visitors received from the sensors located for each location, section, room, hall, area or the like around the site.

BRIEF DESCRIPTION OF THE DRAWINGS

An exemplary embodiment of the present invention is illustrated by way of example in the accompanying drawings in which like reference letters indicate the same or similar elements and in which.

DETAILED DESCRIPTION OF THE INVENTION

Figure 1:
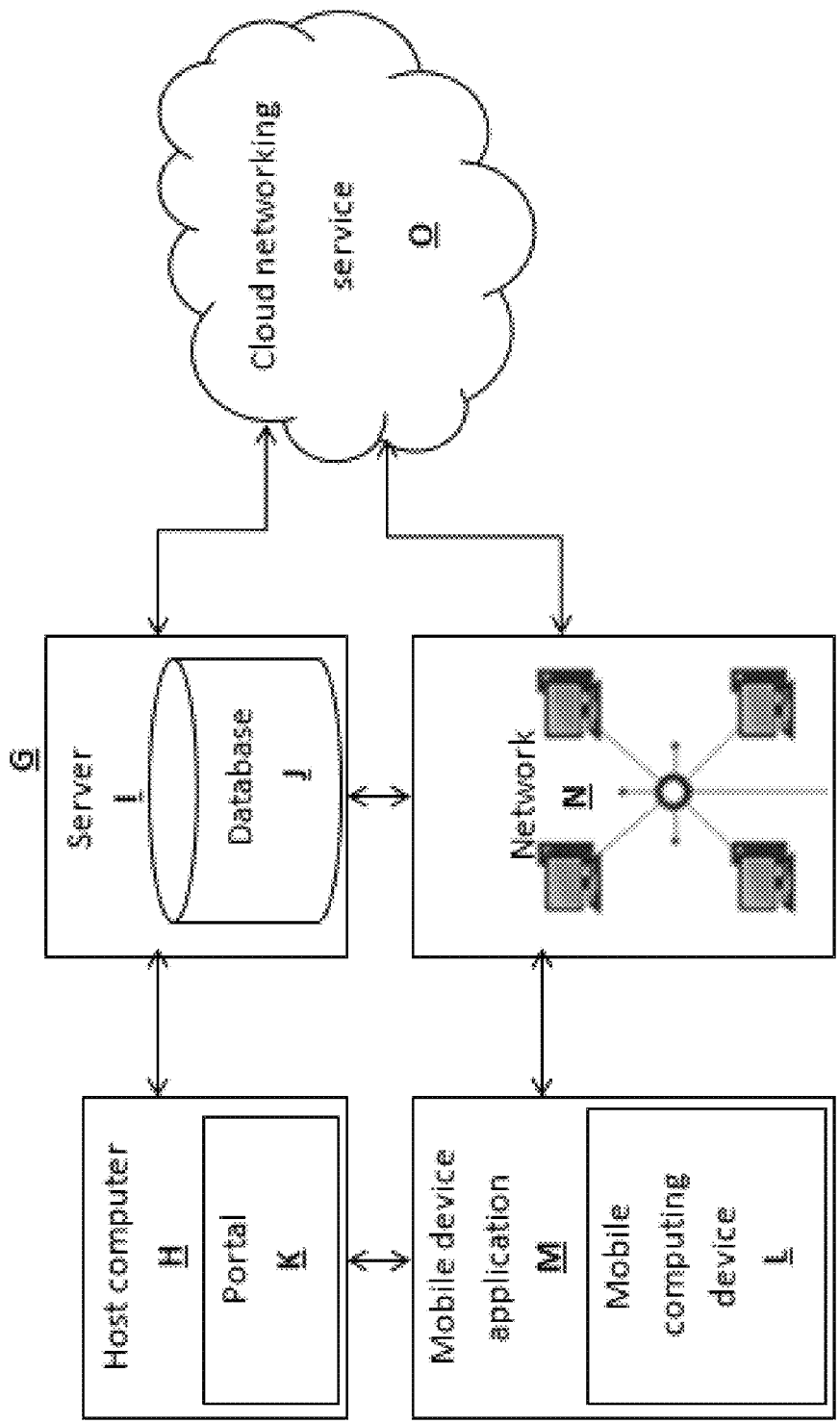
FIG. 1 is a block diagram of an exemplary customized education and navigation for a cultural and/or natural heritage attraction or site system.

As discussed in the background, available guiding systems in a museum or an exhibition environment typically offer an experience where objects are displayed to visitors and/or information is presented, unilaterally, to the visitors without considering their knowledge level, experiences, interests or age. In other words, available systems do not provide an experience that can be customized based on the needs, wants, interests, and backgrounds of the visitors so that the experience can be fulfilling. FIG. 1 illustrates as a block diagram of an exemplary customized education and navigation for a cultural and/or natural heritage attraction or site system G including a host computer H, a server I, a database J, a portal K, a mobile computing device L, a mobile device application M, a network N, and a cloud networking service O.

Figure 2:
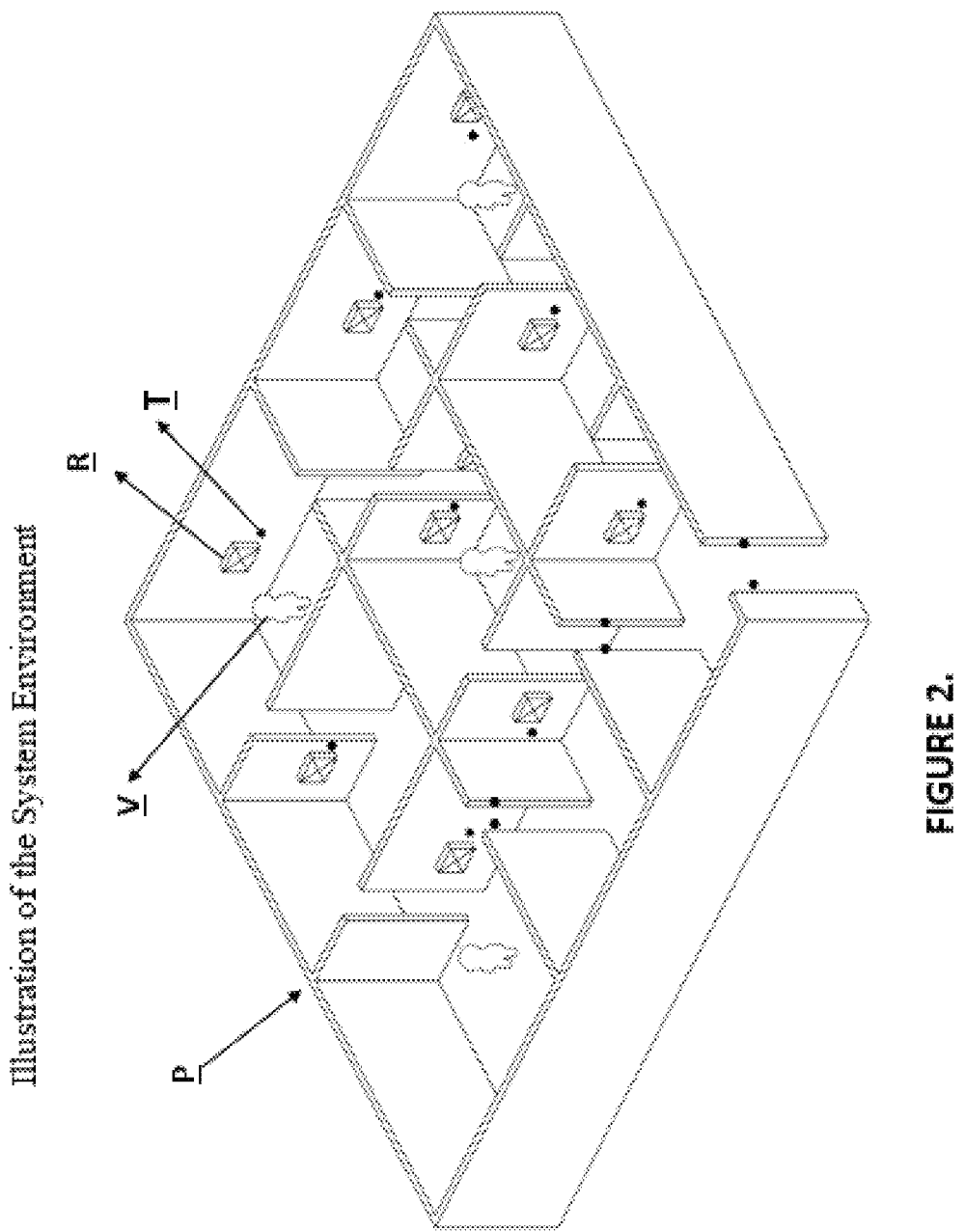
FIG. 2 is an illustration of an environment where the system operates according to one embodiment of the invention.

In relation to this system G, FIG. 2 illustrates a perspective of an environment according to one embodiment of the invention. The environment is designed to foster and enhance visitors' V learning and experience while having fun at a cultural and/or natural heritage attraction or site P. As shown in FIG. 2, visitors V are provided information regarding the objects R or the like on the site P, with the help of wireless sensors T. The movements of a visitor V can be tracked through one or more of a variety of technologies including, but not limited to, quick response (QR) codes, radio frequency (RF), radio frequency identification (RFID) tags, near-field communication (NFC) devices, Wi-Fi, Bluetooth, indoor positioning systems (IPS), local positioning systems (LPS), cell-tracking, and global positioning systems (GPS). The system G can act as a technology-based guide for visitors V without the need for a live docent. The system G can offer written information, but can also offer audio/video information, communication with social networks, customer recommendations, consumer tracking and analytics, and an interface to a store of the attraction or site P.

The system G can include a host computer H and a server I. The host computer H can be used to provide a portal K application that can be used by the administrator of the site P to manage the system G including the educational and navigational subsystems. The site P portal K application can provide a user interface in which the site's P administrator can perform a number of tasks, such as creating, editing, deleting and listing question and answer games and information regarding objects R or the like on the site P, indicating their related locations and carrying capacities for these locations.

The server I can include the database J to store information regarding questions and answers, related objects R or the like, their locations, and carrying capacities for each location. In some embodiments the database J can be stored in the server I and/or a cloud networking service O. The server I can be connected to a cloud networking service O.

Accordingly, the present invention comprises two subsystems for (1) education and (2) navigation for cultural and/or natural heritage attractions or sites P to foster and enhance visitors V learning and make the best of their time. The system G is implemented with a host computer H, a server I, and a mobile computing device L connected by a network N, used by an administrator and a visitor V, the visitor V playing a question and answer game or following a route.

In one embodiment, a system G for exploring a cultural and/or natural attraction or site P is described herein that includes a content and crowd management system G for education and navigation. The system G can include an educational subsystem in the format of a question and answer game prepared for different visitors V considering their needs, wants, interests, knowledge level, experience, and age. These games can also be customized for individual and group visitors V. The system G further includes a navigation subsystem for those visitors V who do not want to play a game but want to easily navigate their way in and around the site P based on their selected criteria. Both the educational and the navigation subsystem are configured to convey written and audio-visual information regarding the objects R or the like on the site P. In this way, the system G provides help and guidance to children who do not know how to read, disabled and senior visitors V. The system G also allows the visitors V to avoid stairs or ramps when making their selections since the stairs or ramps on these sites P challenge seniors and other visitors V with physical limitations. Both the educational and navigation subsystems are further configured to receive real-time visitor V occupancy information from the sensors T installed in each location, section, room, hall, area or the like on the site P and process this information with their specified carrying capacities for crowd management. The sensors can be at least one of motion detectors that can combine infrared and optical sensor technology to detect (notice) radiation caused by body heat. These detectors combine a sensor and fuzzy logic to also determine an object's size, speed and direction of travel. Such detectors communicate via radio frequency (RF) transmissions and trigger a radio frequency (RF) transmission to the system when people enter and exit from each location, section, room, hall, area or the like of the site.

According to one example, the educational subsystem can include a question and answer game to be chosen based on the selected criteria (interests, age, individual/group) of the visitor V after the creation of an account with a username, a password, and an email account for the server I to recognize each visitor V. The server I can also recognize the same visitor V in the subsequent visits to offer the person a different game. The educational subsystem is configured to guide the visitor V to explore the site P with the help of questions and answers. The questions are forwarded to the visitor V based on the selection criteria, input received from the visitor V, location carrying capacities of the site P and their real-time occupancy information. In this way, while the visitor V enjoys the site P, the administrator is able to track and monitor number of visitors V in each location, room, hall, area, or the like on the site P with the help of the wireless sensors T located around to optimize visitor numbers in each location based on carrying capacities determined by the administrator to improve visitor experience. The mobile computing device L of the visitor V recognizes and monitors the received signal and determines the device's L proximity to the wireless sensor T to manage the crowd and provide appropriate information concerning objects R or the like and the facilities including restaurants, elevators, toilets, shops or the like on site P. The educational subsystem can offer fact-based information, but can also offer audio-visual information, communication with social networks, customer recommendations, consumer tracking and analytics, and an interface to a store of the attraction or the site P. The movements of a visitor V can be tracked through one or more of a variety of technologies including, but not limited to, quick response (QR) codes, radio frequency (RF), radio frequency identification (RFID) tags, near-field communication (NFC) devices, Wi-Fi, Bluetooth, indoor positioning systems (IPS), local positioning systems (LPS), cell-tracking, and global positioning systems (GPS). As the visitor V correctly answers a question, he/she gets his/her points and continue with the next question concerning another object R or material or the like on the site P. However, when the visitor V does not provide the correct answer, he/she is offered a clue with a penalty known to him/her. In group games including family games, the system G forwards different questions to different groups or group (family) members for competition after different accounts have been created. In order to manage crowd, the movements of visitors V can also be tracked with the help of sensors T installed in each location, room, hall, area, or the like on the site P. The sensors can be at least one of motion detectors that can signal movement of visitors, therefore, a time and attendance record can be developed, including the time of the day when people enter and exit from each location, section, room, hall, area or the like of the site P. These sensors can combine infrared and optical sensor technology to detect (notice) radiation caused by body heat, so that real-time occupancy information in each location, room, hall, area, or the like on the site P can be developed and processed across their carrying capacities to forward optimum number of people to each location, room, hall, area, or the like on the site P. Sophisticated algorithms are used that combine real-time occupancy data of each location, room, hall, area, or the like on the site P, their carrying capacity and visitor V input to optimize number of visitors V in each location, room, hall, area, or the like on the site P.

According to an example, the navigation subsystem can offer a route to a visitor V who does not want to play a game but wants to find his/her way in and around the site P easily based on his/her needs, wants, interests and selection criteria. A visitor V may like to see only those objects R or the like based on his/her needs, wants, interests, and selection criteria in the limited time he/she has. In this sense, the system G allows the visitor V to choose a route among the available alternatives including the major landmarks on the site P offered by the administrator or create his/her route with the help of his/her selection criteria depending on his/her needs, wants, interests, knowledge level, experiences and age. This subsystem runs with the help of the location information of the objects R or the like on the site P stored in the database J and the real-time occupancy data in these locations with their carrying capacities. Instead of questions and answers, in the navigation subsystem, the visitor V receives directional information for the objects R or the like he/she wants to see and explore. With this subsystem, like the educational subsystem, the mobile computing device L of the visitor V recognizes and monitors the received signal and determines the device's L proximity to the wireless sensor T to manage the crowd and provide appropriate information concerning objects R or the like and the facilities (restaurants, elevators, toilets, shops or the like) on the site P. With this subsystem, like in the educational subsystem, the movements of visitors V can be tracked with the help of one of sensors T installed in each location, room, hall, area, or the like on the site P for crowd management.

In further aspects, the system G allows a visitor V to find his/her way in and around the site P by taking a picture with the help of his/her mobile computing device L. The mobile device application M can locate the visitor V with the help of its image sensor T and amplified augmented reality. In this way, the visitor V can navigate his/her way in and around the site P based on the information received by his/her mobile computing device L concerning the directions for the desired objects R and facilities or the like.

According to another embodiment, the mobile computing device L (which may belong to the visitor V or can be borrowed at the site P) consists of at least a screen, a microphone and a speaker which does not emit radiation safe for children to use. With the help of these devices L, the system G allows children to play the same question and answer game with their family members. In such group/family games, questions are customized based on the age of the visitors V but directed to the same objects R or the like so that the family members stay close to make sure they have fun together. This device L can include a motion and sound detector to prevent children run around or shout when excited by providing them commands in a friendly manner (e.g. lets be silent and walk like a tiger here; by holding your parents hand, whisper like a snake that only your parent can hear).

As an overview of some embodiments for an education and navigation system G for cultural and natural heritage attractions or sites P has been presented above. This invention relates to a method of providing information to a visitor V visiting an indoor or outdoor cultural and/or natural heritage attraction or site P such as a museum, a palace, a national park, a garden or the like and the system G therefor to engage the person with the help of a customized game or navigate the person on the site P in an interactive manner. The invention is for engaging visitors V, fostering their learning and understanding and helping them to make the best of their time while visiting cultural and/or natural heritage attractions or sites P. The invention is also for optimizing number of visitors V in each location, room, hall, area, or the like on the site P based on carrying capacities determined by the administrator and real-time occupancy data received from sensors T to manage crowd and therefore improve visitor experience. Although the invention is described herein with respect to cultural and/or natural heritage attractions or sites P, some embodiments of the invention can be used in zoos, amusement parks, theme parks, large retail stores, shopping centers, outdoor festivals, trade shows, auction houses, airports, resorts, etc. For example, as visitors V tour a theme park or a zoo, the mobile device application M can provide games, routes, audio tours, and information at these attractions. The network N can include a Wi-Fi network, RF, Bluetooth, an IPS, a LPS, or GPS and the visitor's V mobile computing device L can be recognized as the person approaches the wireless sensors T located in and around the place while the person move through that particular place. The invention, in particular the educational subsystem can also be used for other forms of cultural heritage including books, works of art, artifacts or the like to enhance appreciation, learning and understanding.

The above discussion is presented to enable to those skilled in the art to make and use embodiments of the invention. Various changes and modifications will be readily apparent to those skilled in the art without departing from the general scope of the claimed subject matter. It is intended to include all such modifications and alterations within the scope of the claimed subject matter. Furthermore, it is to be understood that the phraseology and terminology used herein is for the purpose of description and should not be regarded as limiting. The use of "including", "comprising", "having", or "consisting" and variations thereof herein is meant to encompass the items listed thereafter and equivalent thereof as well as additional items. Further, "connected" and "coupled" are not restricted to physical or mechanical connections or couplings.

The invention claimed is:

1. The present invention comprises two subsystems; an educational and a navigational subsystem for cultural and/or natural heritage attractions or sites or the like to allow administrators to occupy their visitors, enhance their learning, and make the best of their time and manage the crowd on their site, The system is implemented with a host computer, a server, a database, a portal, a mobile computing device and application and various kinds of sensors installed in and around the site connected by a cloud network, used by an administrator and a visitor, the visitor playing a customized question and answer game or following a route, the system comprising;
   a database in the server of the site and/or the cloud, the database storing a plurality of questions and answers, clues, information regarding related objects or the like at different levels, their locations and carrying capacities for each location of the site;
   a site portal accessible on the host computer, the portal of the site providing a user interface in which the administrator creates, edits, deletes, lists questions and answers, information concerning the objects or the like at different levels considering different backgrounds of their visitors, their locations and carrying capacities for each location;
   a site server accessible to the database, the server of the site receiving signals from the sensors installed for each location section, room, hall, area or the like on the site when people enter and exit, producing actual occupancy data and processing this information with their carrying capacities specified by the administrator for crowd management;
   a mobile device application accessible with the mobile computing device, the mobile device application providing questions and answers or directions created based on the needs, wants, interests and backgrounds of the visitors, actual occupancy data and their carrying capacity in each location, section, room, hall, area or the like on the site, recognizing a proximity of the visitor to the wireless sensors located in and around the site.

2. The system of claim 1 wherein each one of the sensors is identified by at least one of a quick response (QR) codes, radio frequency (RF), radio frequency identification (RFID) tags, near-field communication (NFC) devices, Wi-Fi, Bluetooth, indoor positioning systems (IPS), local positioning systems (LPS), cell-tracking, and global positioning systems (GPS), image/video recognition.

3. The system of claim 1 wherein, a mobile computing application and a server acquire and process the at least one of a quick response (QR) codes, radio frequency (RF), radio frequency identification (RFID) tags, near-field communication (NFC) devices, Wi-Fi, Bluetooth, indoor positioning systems (IPS), local positioning systems (LPS), cell-tracking, and global positioning systems (GPS), image/video recognition.

4. The system of claim 1 wherein the network includes one of a plurality of Wi-Fi access points installed on the site, a local positioning system, an indoor positioning system, and a global positioning system.

5. The system of claim 4 wherein the mobile computing device and a server include at least one of an internet connection module.

6. The system of claim 1 wherein each of the plurality of questions and answers includes at least one of an identification number, a title, an object, a collection, an artist, a style, a level, a location and its carrying capacity, written or audio-visual information concerning the object, material or the like at different levels.

7. The system of claim 1 wherein the portal of the site includes at least one of a portal home page for an administrator to create, edit, delete, and list different levels/types of questions, answers, clues, information for objects or the like in various formats, their locations with carrying capacities, and categories based on the preferences of the administrator considering the needs, wants, interests, and backgrounds of the visitors.

8. The system of claim 1 wherein the visitor uses the mobile device application to access a welcome screen to create an account with his/her needs, wants, interest, and backgrounds and login to the system.

9. The system of claim 8 wherein the mobile device application accesses the educational interface of the portal to create a question and answer game based on the visitors' needs, wants, interests, and backgrounds.

10. The system of claim 9 wherein the question and answer pages include questions, choices, clues, correct answers, points, link for customized information concerning the objects or the like, and a submit icon.

11. The system of claim 8 wherein the mobile device application accesses the navigational interface of the portal to create a route based on the visitors' needs, wants, interest, and backgrounds.

12. The system of claim 11 wherein the route pages include directions and customized information concerning the objects or the like and a continue icon.

13. The system of claim 1 wherein the server acquires and processes actual occupancy data of each location based on at least one of a quick response (QR) codes, radio frequency (RF), radio frequency identification (RFID) tags, near-field communication (NFC) devices, Wi-Fi, Bluetooth, indoor positioning systems (IPS), local positioning systems (LPS), cell-tracking, and global positioning systems (GPS), image/video recognition.

14. The system of claim 1 wherein connected to the server, the mobile device application creates a game or a route by optimizing the preferences of the visitor, carrying capacities and actual occupancy data in a dynamic manner based on at least one of a quick response (QR) codes, radio frequency (RF), radio frequency identification (RFID) tags, near-field communication (NFC) devices, Wi-Fi, Bluetooth, indoor positioning systems (IPS), local positioning systems (LPS), cell-tracking, and global positioning systems (GPS), image/video recognition.

15. The system of claim 14 wherein the mobile device application provides customized questions or routes based on the preferences of the visitor as the visitor moves on the site.

16. The system of claim 14 wherein the mobile device application provides customized questions or routes based on the carrying capacities and actual occupancy data of each location as the visitor moves on the site.

* * * * *